Oct. 31, 1967 B. VURAL 3,350,656

SPIN WAVE TRAVELING WAVE AMPLIFIERS

Filed March 29, 1966 3 Sheets-Sheet 1

INVENTOR
BAYRAM VURAL
BY Edward J. Norton
Attorney

SPIN WAVE TRAVELING WAVE AMPLIFIERS

Filed March 29, 1966 3 Sheets-Sheet 2

INVENTOR.
BAYRAM VURAL
BY
Edward J. Norton
Attorney

INVENTOR.
BAYRAM VURAL
BY
Edward J. Norton
Attorney 3,350,656
SPIN WAVE TRAVELING WAVE AMPLIFIERS
Bayram Vural, Princeton, N.J., assignor to Radio Corporation of America, a corporation of Delaware
Filed Mar. 29, 1966, Ser. No. 538,334
13 Claims. (Cl. 330—5)

This invention relates to traveling wave amplifiers and more particularly to an apparatus which employs interactions between spin waves and electromagnetic waves and between spin waves and waves supported by carrier streams.

The traveling wave tube or amplifier is a device which amplifies electromagnetic waves by the interaction between a stream of electrons and an electromagnetic wave over a plurality of wavelengths. The velocity of the electromagnetic wave, in a conventional tube traveling wave amplifier, is slowed down by causing the wave to travel a greater distance than the electron beam. This is accomplished by causing the electromagnetic wave to travel along a helix delay line, which amounts to a precisely constructed coil of wire or tape. The electromagnetic wave travels along the helix at about the speed of light, but it advances along the axis of the helix as slowly as dictated by the helix pitch. Once the problem of matching velocities was solved, the method of getting an electron beam and an electromagnetic wave to interact was known. However great care is needed in constructing and mounting the helix. The traveling wave tube also requires a high density electron stream in a vacuum. This requirement is especially severe at high microwave frequencies and in the millimeter wavelength region.

Various solid state analogs to the traveling wave tube have been proposed, but these devices are limited in their frequency of operation by a lack of efficient transducers, which are required to couple the electromagnetic wave to the solid state material.

Accordingly it is an object of this invention to provide an improved solid state traveling wave amplifier.

Another object is to provide an improved traveling wave amplifier compatible with microwaves while providing efficient transducing action.

A further object is to provide an improved traveling wave amplifier capable of very high frequency operation.

A further object is to provide an improved traveling wave amplifier which eliminates the need of high density electron streams in a vacuum.

Still a further object is to provide an improved traveling wave amplifier which eliminates the need of a periodic propagating structure such as a helix.

In general, whether one discusses solid state or tube amplifiers, the traveling wave amplification or oscillation process is based on the interaction of two kinds of modes or states of a system. One of the modes must be a positive energy carrying mode. The excitation of a positive energy carrying mode requires adding energy to the system. The other mode must be a negative energy carrying mode where the excitation of this mode requires the subtracting of energy from the system. The negative energy carrying mode is usually supported by an electron or hole carrier stream; the source of energy for amplification is the kinetic energy of the streaming carriers. The positive energy carrying mode must be, essentially, an electromagnetic wave of proper field configuration, phase and group velocity.

The above and other objects are accomplished in accordance with one embodiment of the present invention by producing a stream of carriers in a semiconductor. The semiconductor is placed in close proximity with a spin wave supporting medium such as yttrium iron garnet, YIG, or another suitable magnetic material. A magnetic field is established along the magnetic material. An electromagnetic wave supporting structure is coupled to a first portion of the magnetic material to cause the electromagnetic wave's energy to be transferred to a spin wave in the magnetic material. This spin wave is now slowed down in the magnetic material in accordance with the magnetic field, causing the spin wave to absorb energy from the carrier stream in the semiconductor material. The absorption of this energy causes the spin wave to grow in amplitude. The increased energy spin wave can now be speeded up and coupled to another eelctromagnetic wave supporting structure, resulting in an amplification of the electromagnetic wave.

A more detailed description of the invention will now be given in connection with the accompanying drawing in which.

The terms and abbreviations used in the following specification are defined as follows (M.K.S. units).

$\omega$=angular frequency ($2\pi f$) (radians)/sec.
$k$=wave propagation constant (radians/meter)
$\lambda$=wavelength (meters)
$CW$=cyclotron wave
$SW$=synchronous wave
$\omega_{ce}$=angular cyclotron frequency of electrons
$\omega_{ce}=(eB/m^*)$ (radians)/sec.
$m^*$=effective mass (kilograms)
$e$=electron charge (coulombs)
$B$=magnetic field strength (volt sec./meter$^2$)
$\omega_{pe}$=angular plasma frequency of electrons (radians)/sec.
$NEW$=negative energy carrying wave
$PEW$=positive energy carrying wave
$\omega_{BX}$=angular frequency due to a magnetic field $B_X$ (radians)/sec.
$x$=a positive integer
$DHW$=drifted helicon wave
$NEWS$=negative energy carrying surface wave.

Figure 1:
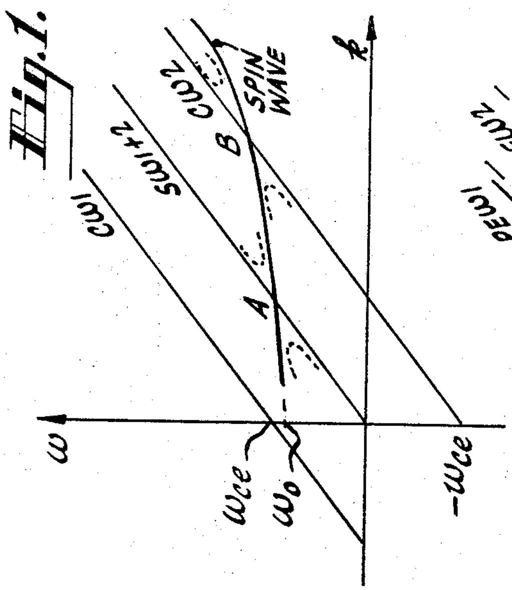

FIGURE 1 is a "$\omega$-$k$ diagram" or a dispersion diagram, a conventional means for graphically showing the wave propagating characteristics of wave propagating media, such as transmission lines, wave-guides or streams of holes and electrons in semiconductors. On such a graph, each point represents a particular phase velocity, as determined by the ratio $w/k$ at that point, and each straight line as SW1 and 2 through the origin represents points of equal phase and group velocity. The diagram of FIGURE 1 shows the possible interactions between transverse waves supported by a thin electron stream in a solid with a spin wave propagating along the magnetic field. $CW_1$ represents the dispersion diagram of the positive energy carrying cyclotron wave which has the same group velocity as SW1 and 2, which in turn represent synchronous waves supported by the same thin electron stream, one of which is a negative energy carrying wave, say SW2. Also shown in FIGURE 1 is a slow cyclotron wave CW2 which has the same group velocity as SW1 and 2 but a slower phase velocity and is a negative energy carrying wave. We shall describe the interaction of spin waves with SW2 and CW2. The spin wave is seen to intersect SW2 and CW2 at points A and B respectively. This means that at these points there will be coupling between the spin wave and the negative-energy-carrying synchronous wave SW2, and between the spin wave and the slow cyclotron or the negative-energy-carrying cyclotron wave CW2. Coupling will take place because there is a match in the phase velocity and field configurations or field polarization for both modes are made to coincide. When waves are caused to couple, there is a transfer of energy. Hence in this case, the energy possessed by the synchronous wave SW2 or the cyclotron wave CW2 can be transferred to the spin wave. It is also possible by the proper arrangement of apparatus to cause energy transfer from the spin wave to the synchronous wave SW1 or the fast cyclotron wave CW1. The dashed lines shown on either side of the intersections A and B represent the boundaries of the area where coupling will take place. Hence there will be coupling within those dashed lines because of the substantial matching of phase velocities within these regions. Therefore the bounds of the dashed lines give an indication of the bandwidth capabilities of the amplifier.

Figure 2:
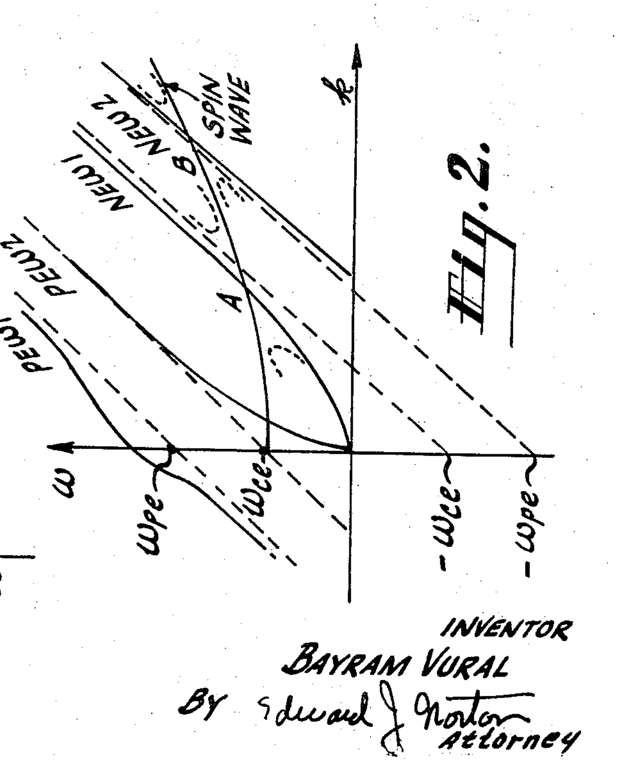

FIGURE 2 is a dispersion diagram showing the interaction of a spin wave propagating along a magnetic field with the waves supported by a finite diameter electron stream. The waves depicted as PEW1, PEW2, NEW1 and NEW2 are electrokinetic waves with transverse magnetic or T.M. field configurations; PEW1 and PEW2 are positive energy carrying waves, as compared to NEW1 and NEW2 which are negative carrying waves. NEW2 and PEW1 are also commonly referred to as slow space charge waves, while PEW2 and NEW1 are commonly referred to as cyclotron waves. It can be seen from FIGURE 2 that the spin wave will couple to NEW1 and NEW2 in the A and B regions, actively. Hence this shows that there can be a transfer of energy between the spin wave and electrokinetic waves as NEW1 and NEW2 supported by a finite diameter stream of particles under the influence of a magnetic field. The difference between a positive energy carrying wave and a negative energy carrying wave is that the positive energy carrying wave requires putting energy into a system to excite the wave, while the negative energy carrying wave requires taking energy out of the system. Hence to launch a wave in a waveguide requires a source. Once the wave is caused to propagate in the waveguide it is a positive energy carrying wave. On the other hand a wave that is propagated on an electron stream can either be a negative-energy-carrying wave or positive energy-carrying wave because the energy of an electron stream may either be increased or decreased when it interacts with a wave.

Spin waves are also positive energy carrying electromagnetic waves, which are strongly effected by the collective excitation of a system of localized electron spins coupled together by the quantum mechanical exchange forces. A magnetic medium supporting spin waves may then be characterized by a frequency and wavelength dependent permeability tensor: $\|\mu(w, k)\|$. This description is quite adequate if the wavelength of the excitation is much greater than atomic distances.

Figure 3:
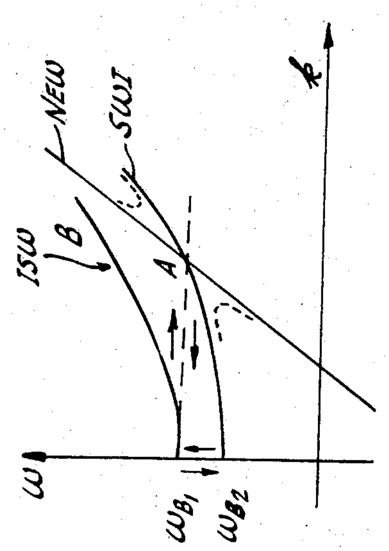
FIGS. 1 through 6 are graphs useful in explaining the invention.

If reference is made to FIGURE 3 there is shown on the dispersion diagram the principle of coupling a wave which may have a phase velocity of the order of magnitude of the speed of light in a vacuum or greater to a spin wave under the influence of a non uniform magnetic field. ISW represents the dispersion diagram of a spin wave under the influence of a magnetic field of value $B_1$. Hence the angular cut off frequency of the spin wave is denoted on the $\omega$ axis as $\omega_{B1}$. If the spin wave is now subjected to a magnetic field of value $B_2$ where $B_1$ is larger than $B_2$, the dispersion diagram SWI starts from the $\omega_{B2}$ point on the $\omega$ axis. $\omega_{B2}$ represents a lower angular radian cut off-frequency and the point on the dispersion line SWI corresponding to the frequency $\omega_{B1}$ or signal frequency has lower phase velocity than it had on ISW where it was infinity. Therefore there is a region denoted as A, where the slowed down spin wave can be synchronized and coupled with a desired negative energy carrying wave shown on the dispersion diagram as NEW. The dispersion diagram of FIGURE 3 readily indicates that there is a region, controllable by a magnetic field $B_1$, in which a spin wave has a high phase velocity. Therefore there is a point on the dispersion diagram ISW such as B, where a fast wave can couple and transfer its energy to the spin wave. The spin wave can now be gradually slowed down under the influence of a magnetic field $B_2$ so that it is in synchronism with a negative energy carrying wave supported by an electron stream. This will cause a growth or amplification of the spin wave, at the expense of the negative energy carrying wave. Now by gradually increasing the magnetic field back to $B_1$, the phase velocity of the amplified spin wave becomes fast and this amplified wave can couple back to a waveguide or a fast transmission media.

Figure 4:
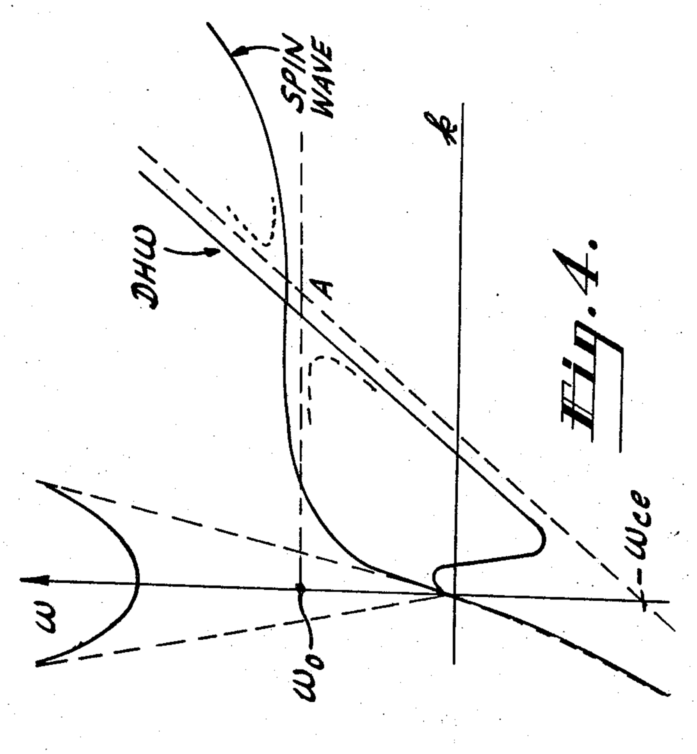

FIGURE 4 is a dispersion diagram showing the interaction of a negative energy carrying helicon wave with a positive energy carring spin wave. A negative energy helicon wave as shown on the dispersion diagram as DHW can react with a spin wave if the helicon is excited by a left-handed circularly polarized plane wave. In a magnetizable material with finite exchange forces, and containing free carriers, there can, therefore, be a strong interaction between these waves leading to a convective instability. The source of energy for the instability is the drift of the free carriers in the material.

Figure 5:
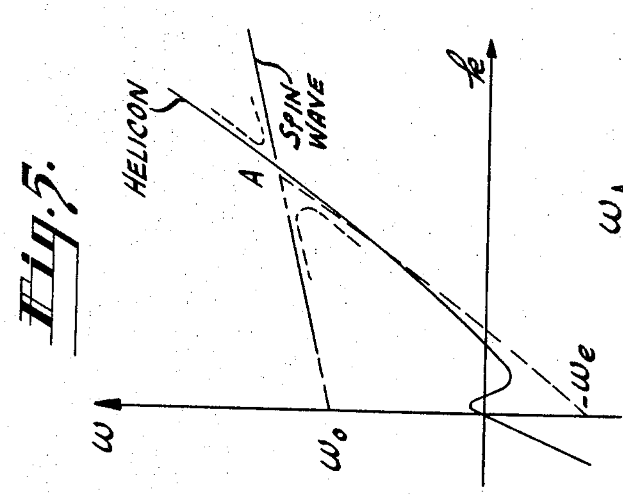

FIGURE 5 sohws the helicon-spin wave interaction in an antifero-magnetic medium consisting of two magnetic sub lattices. Point A again refers to the point of interaction and the dashed lines on either side of A indicate the bounds of the interaction.

Figure 6:
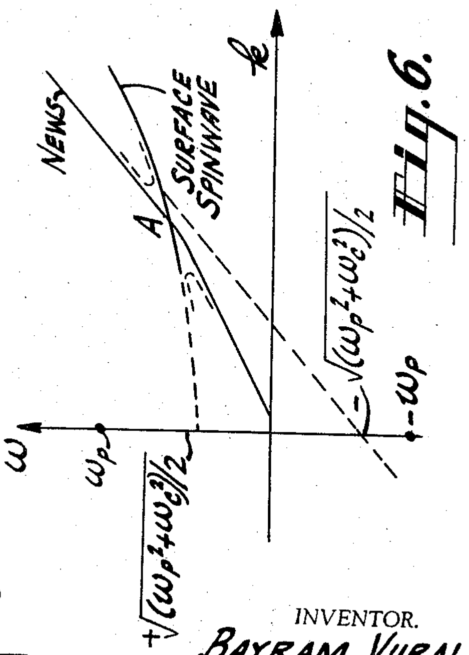

FIG. 6 shows there can be an interaction between a surface wave NEWS and a surface spin wave. This is a special case of the interactions shown in FIGURE 2. The $\omega$ axis shows two points namely $\pm\sqrt{(\omega_p^2+\omega_c^2)/2}$, which are commonly referred to as the hybrid angular frequencies since the value of angular frequency depends on the square root of the sum of the squares of the cyclotron frequency $\omega_c$ and the plasma frequency, $\omega_p$, divided by two.

All of the above dispersion diagrams were derived from dispersion equations for each case described.

In summation the dispersion diagrams of FIGS. 1–6 indicate coupling between negative energy carrying electrokinetic waves and the positive energy carrying spin wave to afford traveling wave amplification. The various negative energy carrying modes that can be utilized are:

(1) Synchronous waves
(2) Slow cyclotron waves
(3) Helicon waves
(4) Slow space charge valve
(5) Hybrid waves (cyclotron-plasma)

The designation of the negative energy carrying mode depends on the field of configuration, hence on the spatial dependence of the radio frequency motion of the carrier stream supporting the above modes.

Figure 7:
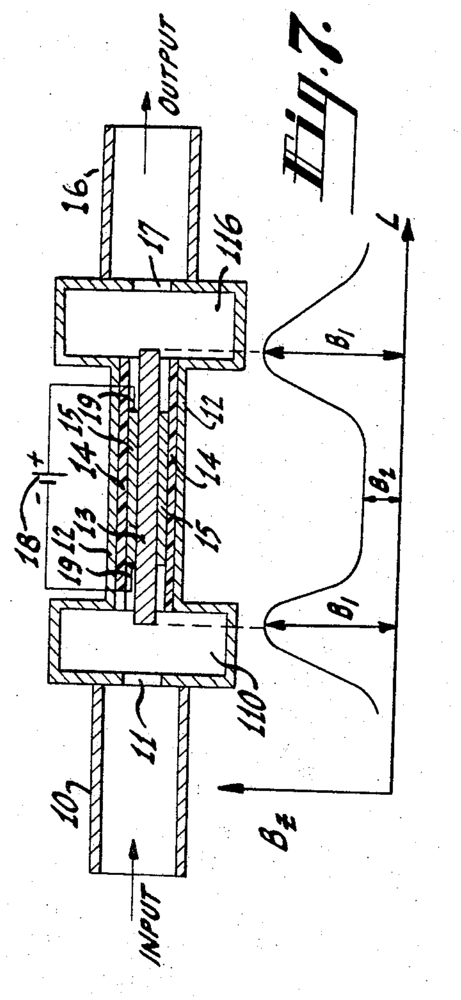
FIG. 7 is a longitudinal sectional view of a spin wave amplifier embodying the invention.

If reference is made to FIGURE 7 there is shown a spin wave amplifier operating in accordance with the dispersion diagrams shown in FIGS. 1, 2 or FIG. 6 depending upon the magnitude of the magnetic field, carrier density and the geometry.

Numeral 10 refers to an input waveguide which is capable of supporting an electromagnetic wave depicted by the arrows at the input. The input waveguide 10 is designed to accommodate a transverse magnetic or T.M. wave. Waveguide 10 is shown in rectangular cross section, but could be a circular waveguide or another suitable shape as well. There is shown an opening 11 which is referred to as an iris, the purpose of iris 11 is to concentrate the wave's energy into the desired field configuration while preventing unwanted modes of propagation. The wave propagating in waveguide 10 is a fast wave as its phase velocity is of the order of magnitude of light in a vacuum or greater. The wave propagated along the input waveguide 10 is coupled through the iris 11 to a waveguide resonator 110. There is an opening in the resonator 110 through which a rod or bar 13 of magnetic material extends. The rod is put in the wave guide resonator in such a way, that it is subjected to a high R.F. magnetic field. The rod or bar 13 is fabricated from a material that is capable of supporting a spin wave. Such materials are classified as ferromagnetic, ferri-magnetic and antiferromagnetic materials. In these crystalline materials there is a coupling between magnetic moments or electron spins of neighboring atoms in the crystal. This coupling is due to quantum mechanical exchange forces and permits existence of collective excitation of the spin system, which are called spin waves. Examples of ferromagnetic materials which could be used for rod 13 are single crystals of ferromagnetic metals such as iron, nickel and cobalt or single crystals of semiconducting magnetic materials such as iron sulfide (FeS), manganese telluride (MnTe), lithium ferrite ($LiFe_5{=}O_4$). There are also single crystals of insulating ferrites, garnets or antiferromagnetic material which would serve to support spin wave such as yttrium iron garnet (YIG) ($Y_3Fe_5D_{12}$), manganous fluoride ($MnF_2$), lanthanum chromate, $LaCrO_3$, rubidium manganese fluoride, $RbMnF_3$ and others.

The rod 13 is surrounded by a layer of semiconducting material 15, which is placed around the bar 13 in the center region by a suitable deposition technique or other process. The semiconductor material 15 may be fabricated from indium antinomide (InSb), gallium arsenide (GaAs), silicon (Si), germanium (Ge) or a suitable semiconducting material.

The characteristics of the semiconductor material 15 are that it possesses a high carrier concentration and has the desired mobility. In order to prevent the shorting of the semiconductor to the surrounding shielding wall 12, there is shown a layer of a suitable insulating material 14, such as latex, fiber glass, alumina oxide or another suitable material. The surrounding wall 12, acts as a shield to prevent radiation loss of the waves propagating in the rod 13 and the semiconductor 15. On either side of the semiconductor 15 are two contacts 19, which are brought out by wire or suitable means to enable the connection of a source of potential or biasing source 18 across the semiconductor layer 15. The rod 13 extends into an output resonator 116, which may be the mirror image of the resonator 110. Also shown is an iris 17, which serves the same purpose as iris 11. The output waveguide 16 extends from the resonator 116 and is capable of supporting an electromagnetic wave. The output guide 16 could also be circular, elliptical or some other shape capable of supporting an electromagnetic wave. Longitudinal to the apparatus described above there is shown a graph of a shaped magnetic field profile. The magnetic field intensity has a high value $B_1$ near the end of the input waveguide and gradually assumes the lower value $B_2$ at the section of the apparatus where the rod 13 is enclosed by the semiconductor layer 15. The field is then increased to the value $B_1$ at the indicated portion of the output resonator 116. While the actual magnetic structure is not shown in the drawing, magnetice field profiles as shown in FIGURE 1 can be obtained by shaped solenoids, permanent magnets or controlling the ampere-turns of a magnet. Depending on the frequency of operation the magnetic field $B_2$ would be approximately 2,000–4,000 gauss for $x$ band operation, while the value of $B_1$ would be 3,000–6,000 gauss. The transition region between $B_1$ and $B_2$ should be adiabatic as shown in the figure and therefore undergo a gradual change. Techniques for obtaining magnetic fields with varying profiles are known and such structure can be provided following such techniques.

The operation of the device of FIGURE 7 is as follows. An electromagnetic or fast wave is launched in the input waveguide 10, and caused to assume a T.M. field configuration. The wave propagates towards the bar of magnetic material 13, where, by the action of the magnetic field $B_1$, it is caused to couple its energy to a high phase velocity spin wave. The gradual decreasing of the magnetic field from $B_1$ to $B_2$ causes the coupled spin wave to gradually change its phase velocity to a lower value as indicated in the dispersion diagram of FIG. 3. The spin wave supported by the magnetic material 13 is now brought into synchronism with the carrier stream wave or negative energy carrying wave propagating through the semiconductor layer 15, and energized by the battery 18. The waves in the semiconductor 15 could be cyclotron waves under the influence of the magnetic field $B_2$, "helicon" surface waves, synchronous waves, or space charge waves. The energy from the waves in the semiconductor 15 is coupled to the spin wave in the magnetic material 13. The increased energy spin wave propagates towards the output waveguide 16, and as the magnetic field profile is changed from $B_2$ back to $B_1$ the velocity of the wave increases. The spin wave will couple into the output waveguide resonator 116 which is coupled to waveguide 16, propagating fast electromagnetic waves. The electromagnetic wave in the output waveguide 16 is the amplified input electromagnetic wave, as the wave possesses the added energy transferred from the carrier stream in the semiconductor layer 15.

In the above description the spin wave behaved as the positive energy carrying wave and hence would be analogous to the helix of a traveling wave tube (or other type periodic slow wave structures). The carrier stream wave, supported by holes or electrons, behaves as the negative energy carrying wave and is analogous to the electron beam of the traveling wave tube and more specifically to the slow space-charge wave of the electron beam.

Figure 8:
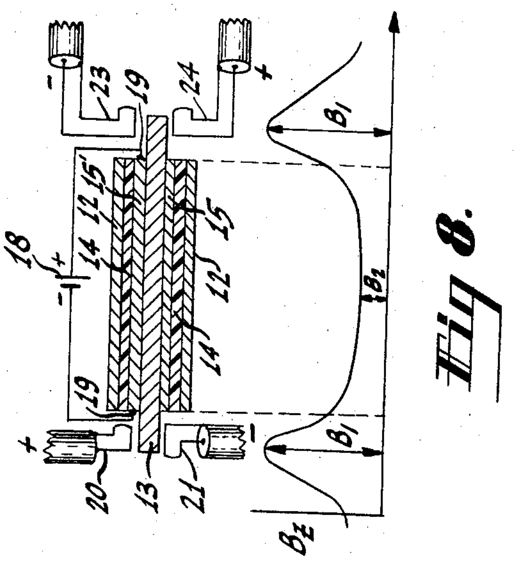
FIG. 8 is a longitudinal sectional view of another spin wave amplifier according to the invention.

If reference is made to FIGURE 8 there is shown a spin wave traveling amplifier using a different coupling technique. The spin wave supporting magnetic material 13, is surrounded by a layer of semiconductor material 15, as described previously. The semiconductor material 15 has two contacts 19 on each end. These contacts 19 are brought out via leads and connected to battery 18, to cause a flow of carriers. There is also a dielectric layer 14 which serves to prevent the semiconductor material 15, from shorting to the radiation shielding layer 12. The apparatus is subjected to a magnetic field profile, as shown in FIGURE 8, beneath and longitudinal to the structure. An electromagnetic wave is coupled to the bar of magnetic material 13 by means of two loop couplers 20 and 21. These couplers carry electromagnetic signals of the same frequency and amplitude but differing in phase by approximately 180 degrees. Hence when coupler 20 is positive, coupler 21 is negative. The couplers shown could be loops, coaxial lines or circulators. In actual practice the couplers 20 and 21 could exist in one transmission line with a common center conductor and two separate parallel conductors. Couplers as shown in FIGURE 8 will cause a quasi-transverse magnetic wave (quasi-T.M. wave) to propagate.

These quasi-T.M. waves will couple to fast spin waves in the rod 13. As was previously described the profile of the magnetic field slows down the spin waves until, at the value $B_2$, the spin waves go into synchronism with the desired negative energy carrying waves supported by the carrier streams in semiconductor 15, which may be the result of hole or electron motion. This causes a growth of the spin wave and consequently increases its energy. The spin wave propagates towards the output end of the bar 13 where the magnetic field is gradually increased to $B_1$ and in doing so increases the phase velocity of the spin wave. This causes the wave to couple back as an electromagnetic wave in the output coupling loops 23 and 24.

Figure 9:
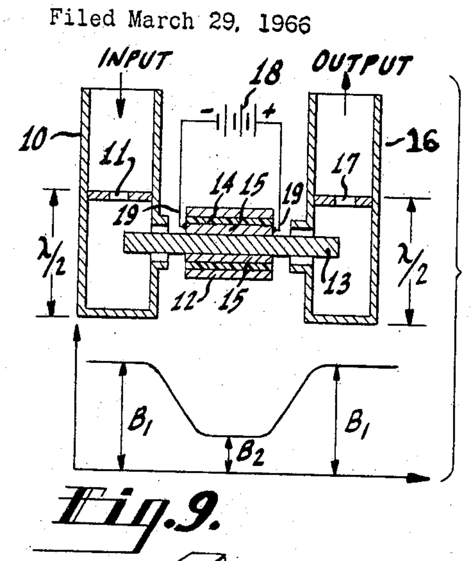
FIG. 9 is another longitudinal sectional view of a further embodiment of an amplifier according to the invention.

FIGURE 9 shows a structure which will amplify an electromagnetic wave possessing different field characteristics than those previously described. The input waveguide 10 is capable of supporting a transverse electric wave. When waveguide 10 is excited the T.E. mode will propagate. The iris 11 acts to concentrate the peak of the wave's energy at the input end of the bar of YIG 13, for example. The magnetic field at this end of the bar 13 has a value of B1 as shown by the magnetic field intensity diagram longitudinal and beneath the apparatus. The energy from the electromagnetic wave in waveguide 10 is transferred to a fast spin wave in rod 13. The magnetic field profile is gradually caused to assume a value of $B_2$. This decrease in the magnetic field intensity causes the coupled spin wave to slow down until it possesses a phase velocity comparable with an electrokinetic wave propagating in the semiconductor layer 15 due to the battery 18 and the magnetic field $B_2$. The wave on the carrier stream, which may be a synchronous wave, cyclotron wave, "space-charge" wave or "helicon" wave, transfers its energy to the spin wave, causing it to be amplified. The reversal in magnetic field causes the amplified spin wave to increase its phase velocity at the output end of bar 13. Here the spin wave's velocity is such that it can couple to the output waveguide 16, whereby one obtains an amplified electromagnetic wave.

Figure 10:
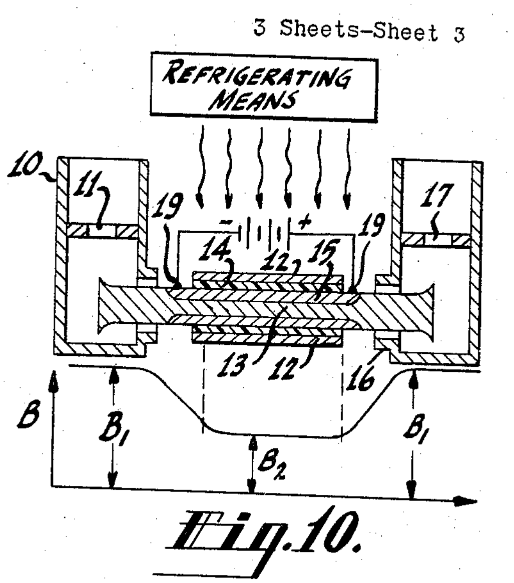
FIG. 10 is a longitudinal sectional view of an alternate scheme to that shown in FIG. 9.
Figures 11, 12:
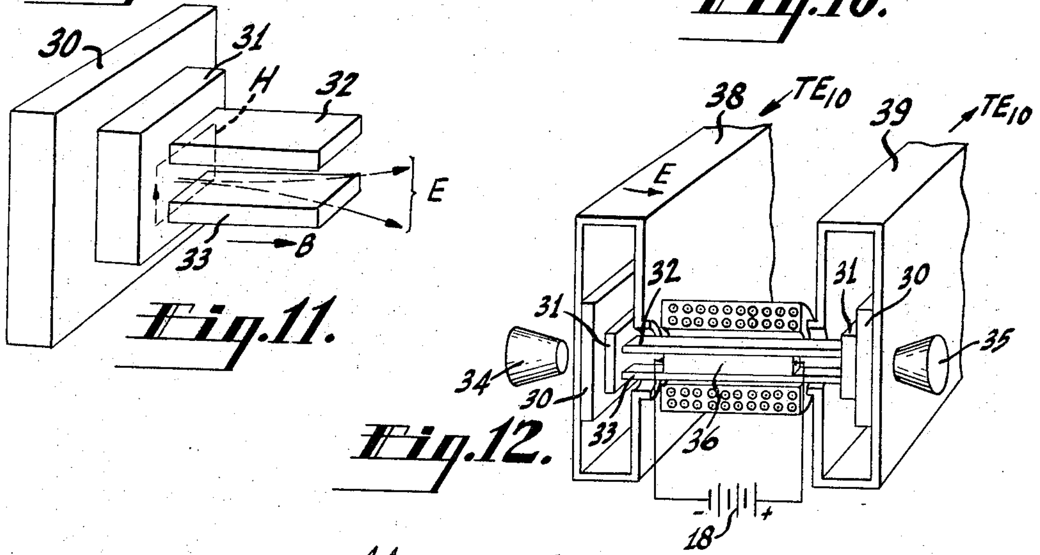
FIG. 11 is a perspective view of a resonator which can be employed in accordance with this invention.
FIG. 12 is a perspective view of a spin wave amplifier according to this invention.

The amplifier shown in FIGURE 10 operates in the same manner as that of FIGURE 9. If reference is made to FIGURE 10, the input and output sections of bar 13 are shaped to allow greater coupling efficiency at the input and output ends. The semiconductor layer 15 is formed by doping the appropriate section of bar 13. In this case bar 13 would be grooved or cut out and a semiconducting material would be deposited where the magnetic material was removed. This allows for greater coupling efficiency. Also shown in FIGURE 10 is a refrigerating means 200, which is utilized to reduce the carrier losses in the magnetic material 13, and the semiconductor material 15. Placing semiconductor and ferrites in refrigerated environments is a well known means to reduce such losses and not considered part of this invention. FIGURE 11 shows a resonator which could be employed as a coupling device for a spin wave amplifier. Numeral 30 refers to an insulating backing block, which is necessary as a mounting base for the resonator. Numeral 31 refers to a dielectric resonator element whose height, width and length are functions of the frequencies to be accommodated. The dielectric block 31 is bonded to the insulating block 30 by suitable means. Attached to the dielectric element 31 are two slabs of spin wave supporting material 32 and 33. These are separated from one another by a fraction of a wavelength (or more for "surface" wave interaction) and are equidistant from the center of the dielectric block 31. If an electric field E is caused to propagate through the dielectric block 31 in the direction as shown in FIGURE 11, it will cause an RF-magnetic field of value H to be set up as shown in the figure. H is the magnetic field intensity and is related to B by $B=\mu H$, where $\mu$ is the permeability of the magnetic material. Hence for the resonator shown an electric field E, sets up a magnetic field H which is concentrated within the cross sections of the magnetic material bars 32 and 33. The bars 32 and 33 will be excited by the magnetic field H and the H field will cause spin wave to propagate in the magnetic bars 32 and 33.

FIGURE 12 shows a spin wave traveling wave amplifier using the resonator of FIGURE 11. There is shown an input waveguide 38 which will support an electromagnetic wave in the $T.E._{10}$ field configuration. In this mode the electric field is transverse to the waveguide 38 axis and extends between the two walls that are closest together, i.e. the side walls of waveguide 38. The electric field direction is shown by the arrow labelled E on the top wall of waveguide 38. Hence the electric field of the $TE_{10}$ mode sets up a magnetic field as shown in FIGURE 11 in the dielectric block 31 situated in waveguide 38. The insulating block 30 serves to prevent radiation losses while providing a mounting base for the dielectric member 31. The two bars of magnetic material in this case YIG, 32 and 33, are excited by the R.F. magnetic field H which sets up high phase velocity spin waves in 32 and 33. The electromagnetic wave in waveguide 38 transfers its energy to the spin waves in bars 32 and 33. The spin waves in the bars 32 and 33 are made to undergo a change in phase velocity as previously described due to a varying magnetic field profile supplied by magnets 34 and 35 and by the solenoid 37. Magnets 34 and 35 are, for example, of high saturation magnetic material placed in a uniform magnetic field, not shown, to produce the desired non-uniform internal field in the spin wave supporting bars 32 and 33. The decrease in the spin wave's velocity allows it to go into synchronism with the electrokinetic waves on the carrier streams in a semiconductor bar 36. Bar 36 is placed between the two spin wave supporting bars 32 and 33. As described previously, there is a contact on each end of the bar 36, which is brought out by suitable means to a source of potential 18. The energy from the waves on the carrier streams in the semiconductor 36 is transferred to the spin wave causing it to grow in amplitude. The spin wave is speeded up by the action of the magnetic field and caused to couple to an output waveguide 39 by the action of a similar resonator to that of the input resonator composed of insulating block 30 and dielectric block 31 joined to the two bars of magnetic material 32 and 33.

Figure 13:
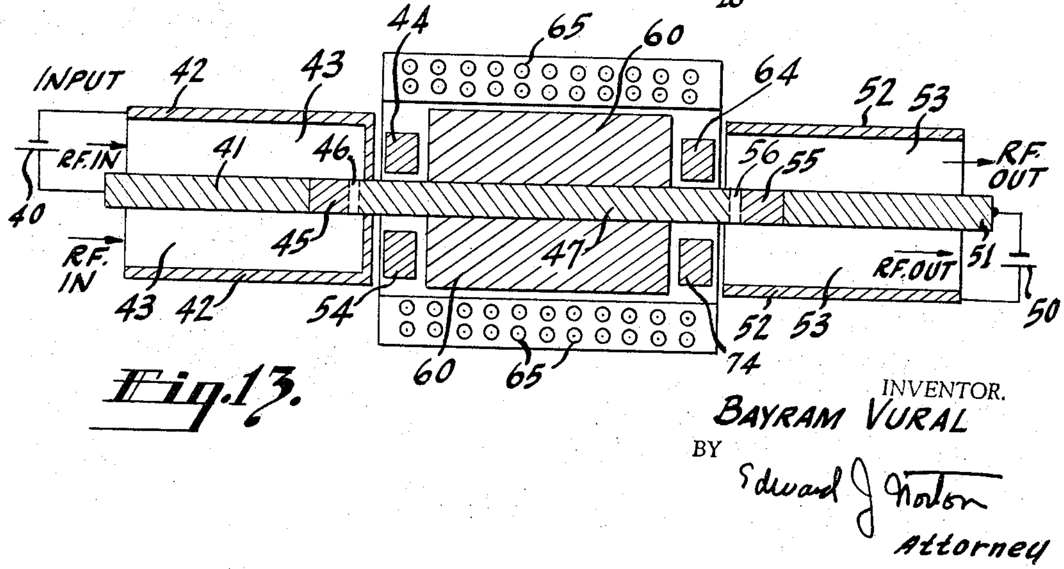
FIG. 13 is a longitudinal sectional view of a spin wave amplifier employing depletion layers for coupling.

FIGURE 13 shows a spin wave traveling wave amplifier where the coupling of the electromagnetic wave is accomplished by the use of semiconductor junctions. A longitudinal cross sectional view of such a semiconductor junction coupled spin wave amplifier is shown. Numeral 42 refers to the outer conductor of a strip transmission line coupler, which is similar to a coaxial line or a parallel plate transmission line. Numeral 41 refers to the center conductor of the coupler. In between the outer conductor 42 and the center conductor 41 there is a dielectric material 43, which may be air, glass, mica, polystyrene or another suitable material. In contact with the center conductor 41 there is shown a zone of semiconductor material 45. The zone 45, could be composed of p or n type material depending on the mode of operation desired, and such material may be silicon, germanium, indium antinomide, gallium arsenide or some other suitable material properly doped to establish either a p or n type zone. In FIGURE 13 the zone 45 is assumed to be n type material and is reverse biased by a battery 40, whose positive terminal is connected to the inner conductor 41 and whose negative terminal is connected to the outer conductor 42. The outer conductor 42 is brought down and is in contact with a second zone of semiconductor material 47, which in this case would be p type material. Hence zones 45 and 47 form a P-N junction where they meet and the reverse bias supplied by battery 40 sets up a depletion region 46 between the two zones of material 45 and 47. The p material zone 47 is enclosed by an insulating ferrite material 60, which is capable of supporting spin waves, such as YIG or some other ferri or anti ferro-magnetic material. The semiconductor zone 47 extends into an output strip line coupler which consists of the outer conductor 52, dielectric material 53 and the inner conductor 51. There is a bias supply 50 shown between the inner and outer conductors. The negative side of the battery supply 50 is connected to the inner conductor 51 which is in contact with a third zone of n-type semiconductor material 55. The positive side of battery 50 is coupled to the outer conductor 52. This biases the P-N junction formed by zones 55 and 47 in the forward direction, forming a junction region 56.

While a separate battery 50 is included for simplicity, the bias for the output P-N junction in practice could be taken from battery 40. Surrounding the insulating magnetic material 60 and the semiconductor zone 47 is a solenoid 65, used to provide the proper level of magnetic field to support spin wave propagation in the magnetic material 60. Between the inner walls of the strip transmission line couplers and the magnetic material 60 are four bars of ferrite 44, 54, 64 and 74. These four bars 44, 54, 64 and 74 are ferrites with high saturation magnetization and are used for magnetic field shaping. Examples of these are manganese ferric oxide ($MnFe_2O_4$) and lithium ferric oxide ($LiFe_5O_8$).

The operation of the amplifier is as follows. The input junction 46 is reversed biased and is driven into the breakdown or avalanche region by the applied radio frequency or R.F. field indicated by the arrows labelled R.F. in. The R.F. or radio frequency wave causes majority carriers, in this case, holes, to be injected into the semiconductor zone 47. This transfers the R.F. wave's energy to the majority carrier stream. The magnetic field variation produced at the input by the bars of magnetic material 44 and 54 and the solenoid 65, cause spin waves to propagate in the magnetic material 60. The majority carrier stream in semiconductor zone 47 couples to the spin wave and energy is transferred from the spin wave to the majority carrier stream. As the majority carrier stream travels along the zone 47 it is amplified by this interaction of the stream with the spin waves. At the end of the interaction region the signal on the carrier stream is coupled out via junction 56 which is forward biased. The wave has a sufficient velocity, due to the magnetic field shaping, to cause it to couple to the output strip transmission line coupler composed of outer conductor 52, dielectric layer 53, and the center conductor 51.

It is noted that in principle the input junction could be forward biased and the output junction could be reversed biased. It is also possible to reverse the polarity of the batteries 40 and 50 and use oppositely doped semiconductor zones to those shown i.e. p type for zone 45, n type for 47 and p type for 55. All that is necessary is to use depletion regions or junctions as 46 and 56 to bunch the carriers.

What is claimed is:

1. In combination,
(a) means for establishing a stream of charge carriers in a given direction,
(b) means for establishing a magnetic field in a direction longitudinal to said stream of carriers,
(c) means for propagating a spin wave longitudinal to and in the same direction as said stream of carriers,
(d) means including said magnetic field establishing means to couple said spin wave to said carrier stream to cause growing wave interaction.

2. A traveling wave amplifier for amplifying a fast electromagnetic wave comprising:
(a) means for establishing a stream of charge carriers in a given direction,
(b) means for establishing a magnetic field in a direction longitudinal to said stream of carriers,
(c) means for propagating a spin wave longitudinal to and in the same direction as said stream of carriers,
(d) means for coupling said electromagnetic wave to said spin waves, and
(e) means including said magnetic field establishing means to slow down said spin wave causing said spin wave to couple to said carrier stream to cause growing wave interaction.

3. A traveling wave amplifier for amplifying a fast electromagnetic wave comprising:
(a) means for establishing a stream of charge carriers in a given direction,
(b) means for establishing a magnetic field in a direction longitudinal to said stream of carriers,
(c) means for propagating a spin wave longitudinal to and in the same direction as said stream of carriers,
(d) means for coupling said electromagnetic wave to said spin wave,
(e) said magnetic field establishing means operating to slow down said spin wave causing said spin wave to couple to said carrier stream to cause growing wave interaction and thereafter to speed up said growing wave causing said growing wave to propagate as a fast spin wave, and
(f) output means responsive to said fast spin wave for propagating said electromagnetic wave amplified.

4. A growing wave device comprising:
(a) a first body of non-metallic material capable of supporting spin waves in the presence of a magnetic field,
(b) a second body of semiconductor material capable of supporting a stream of carriers, said second body positioned longitudinally and in close proximity with said first body of material,
(c) means for producing a magnetic field with a variable field profile longitudinal to said first and second bodies,
(d) means for coupling a fast wave transmission line to said first body causing a fast wave carried thereby to transfer it's energy to that of said spin wave according to said variation of profile of said magnetic field,
(e) means for applying a direct current potential to said second body causing a carrier stream to propagate,
(f) said magnetic field operating to bring about the transfer of energy from said stream of carriers to said spin wave.

5. The traveling wave amplifier according to claim 4 and including said means for coupling said fast wave transmission line to said first body being composed of two loop couplers each propagating the fast wave carried thereby 180 degrees out of phase with one another.

6. A growing wave device comprising:
(a) a first body of non-metallic material capable of supporting spin waves in the presence of a magnetic field,
(b) a second body of material capable of supporting a stream of carriers, said second body positioned longitudinally to and in close proximity with said first body of material,
(c) means for producing a magnetic field with a variable profile longitudinal to said first and second bodies,
(d) means for applying a bias potential to said second body causing a stream of carriers to flow.
(e) means for coupling a fast wave transmission line to said first body's input end causing a fast wave carried by said line to couple to said spin wave according to said varying magnetic field profile,
(f) said magnetic field operating to slow down said spin wave towards the center of said first body to produce an interaction between said slowed down spin wave and said carrier stream resulting in the transfer of energy from said carrier stream to said slowed down spin wave.

7. A traveling wave amplifier comprising:
(a) a first body of non-metallic material capable of supporting spin waves in the presence of a magnetic field,
(b) a second body of material capable of supporting a stream of carriers, said second body positioned longitudinally to an in close proximity with said first body,
(c) a fast transmission line comprising a hollow waveguide of rectangular cross section,
(d) means for establishing a varying magnetic field profile in a direction longitudinal to said first and second bodies,
(e) means including an end portion of said waveguide extending substantially parallel to the direction of said magnetic field for coupling an electromagnetic wave propagated in said wave-guide to said first body of material to excite a spin wave in said first body of material, (f) means for causing a stream of carriers to flow in said second body in a direction substantially parallel to said spin wave, (g) said magnetic field profile establishing means operating to change the velocity of said spin wave so that the phase velocity thereof is close to the phase velocity of said carrier stream for growing wave interaction with said carrier stream.

8. A traveling wave amplifier comprising:

(a) a first body of non-metallic material capable of supporting a spin wave in the presence of a magnetic field, (b) means for producing a stream of carriers longitudinal to said first body of material, (c) means for establishing a variable magnetic field profile in a direction substantially longitudinal to said stream of carriers and causing slow waves to propagate on said carrier stream, (d) a fast wave transmission line comprising a rectangular waveguide, (e) means including a dielectric resonator coupled to said line and defining a first region for coupling said line to said first body of material to excite a spin wave in said first body, (f) the intensiy of said magnetic field in said first region being such that the phase velocity of said spin wave in said first body is substantially equal to the phase velocity of waves along said coupling means and, (g) said magnetic field establishing means operating to slow down said spin wave's phase velocity causing said spin wave's velocity to attain a velocity substantially equal to the phase velocity of said carrier stream producing a growing wave interaction of said spin wave with said carrier stream.

9. A traveling wave amplifier for amplifying a fast electromagnetic wave comprising:

(a) an input waveguide capable of supporting an electromagnetic wave, (b) a first body of non-metallic material capable of supporting a spin wave, (c) means for coupling said first body of material to said input waveguide, (d) a second body of material capable of supporting a stream of carriers, said second body placed in close proximity and longitudinal to said first body, (e) means for applying a source of potential to said second body of material to cause a carrier stream to propagate.

(f) means for applying a magnetic field longitudinal to said first and second bodies to cause said electromagnetic wave to couple to said spin wave in said first body of material and said coupled spin wave to exchange energy with said carrier stream in said second body.

10. The amplifier according to claim 9 where said first body is yttrium iron garnet and said second body is indium antinomide.

11. A traveling wave amplifier for amplifying a fast electromagnetic wave comprising:

(a) an input waveguide capable of supporting an electromagnetic wave in the $TE_{10}$ field configuration, (b) a member of dielectric material positioned in said input waveguide, (c) a first slab of non-metallic spin wave supporting material coupled tranverse to said member of dielectric material, (d) a second slab of non-metallic spin wave supporting material longitudinal to said first slab and coupled to said member of dielectric material, said first and second slabs positioned on said member of dielectric material in such a manner as to form a cavity between opposing surfaces of said slabs, (e) a body of semiconductor material positioned in said cavity formed by said first and second slabs, (f) means for causing a stream of carriers to propagate in said body of semiconductor material, (g) means for establishing a magnetic field with a varying profile longitudinal to said first and second slabs to cause an electromagnetic $TE_{10}$ wave in said input wave guide to be coupled to said dielectric member causing said dielectric member to excite spin waves in said first and second slabs of spin wave supporting material, the spin waves in said first and second slabs coupling to said carriers stream in said semiconductor body for growing wave interaction.

12. A traveling wave amplifier for amplifying a fast electromagnetic wave comprising:

(a) a body of semiconductor material having three adjacent zones, said first zone being of opposite conductivity to said second zone, said third zone being of the same conductivity as said first zone, (b) a first coaxial line having an inner and outer conductor, (c) means for coupling said outer conductor of said first coaxial line to said second zone of semiconductor material, (d) means for coupling said inner conductor of said first coaxial line to said first zone of semiconductor material, (e) means for coupling a source of potential between said inner and outer conductors to cause said first zone to be reversed biased with respect to said second zone causing a depletion region to be formed between said first and second zones, (f) means, including said coaxial line, for coupling a fast wave to said depletion region to cause avalanche breakdown of said region causing majority carriers to propagate in said second zone, (g) a body of non-metallic spin wave supporting material in close proximity with and enclosing said second zone, (h) means for applying a magnetic field longitudinal to said body of spin wave supporting material to excite spin waves therein and thereby serve to couple said spin waves and said majority carriers in said second zone to cause growing wave interaction, (i) means coupled to said second and third zones of said body of semiconductor material to form a forward biased junction between said second and third zones, (j) means including a second coaxial line coupled to said second and third zones to cause said growing wave to propagate along said coaxial line as a fast electromagnetic wave.

13. A traveling wave amplifier as claimed in claim 12 where said first zone is n type conductivity, said second zone is p conductivity and said third zone is n type conductivity.

References Cited

UNITED STATES PATENTS 3,158,819 11/1964 Tien ---------------- 330—5

OTHER REFERENCES

Stern et al.: "Physical Review," July 15, 1963, pp. 512–516. (Copy in Sci. Lib.)

ROY LAKE, *Primary Examiner.*

DARWIN R. HOSTETTER, *Examiner.*